United States Patent [19]

Hester

[11] 4,267,613
[45] May 19, 1981

[54] BEE KEEPING APPARATUS

[76] Inventor: Dewey S. Hester, 878 Belanger St., Houma, La. 70360

[21] Appl. No.: 71,480

[22] Filed: Aug. 31, 1979

[51] Int. Cl.³ .............................................. A01K 47/02
[52] U.S. Cl. .......................................................... 6/10
[58] Field of Search .................... 6/2 R, 10, 11, 12 R, 6/12 F

[56] References Cited
U.S. PATENT DOCUMENTS

| 2,324,227 | 7/1943 | Muth | 6/11 |
| 2,366,182 | 1/1945 | Dadant et al. | 6/10 |
| 3,783,460 | 1/1974 | Goff | 6/10 |

FOREIGN PATENT DOCUMENTS 2870 of 1911 United Kingdom ..................... 6/10

Primary Examiner—Robert Peshock
Assistant Examiner—Robert P. Swiatek
Attorney, Agent, or Firm—Victor J. Evans & Co.

[57] ABSTRACT

Disclosed herein is a bee keeper frame for use as a brooding area within a beehive including a wax brooding foundation fastened to a framework formed from a substantially rectangular grid. The wax brooding foundation is deployed within the frame by means of a guide which has a substantially U-shaped configuration in which one of the leg portions has a greater length than the other. A handle is provided on the guide to assist in removal of the guide when the wax brooding foundation has been properly affixed to a back rail support which forms a portion of the framework.

9 Claims, 4 Drawing Figures

U.S. Patent  May 19, 1981  4,267,613
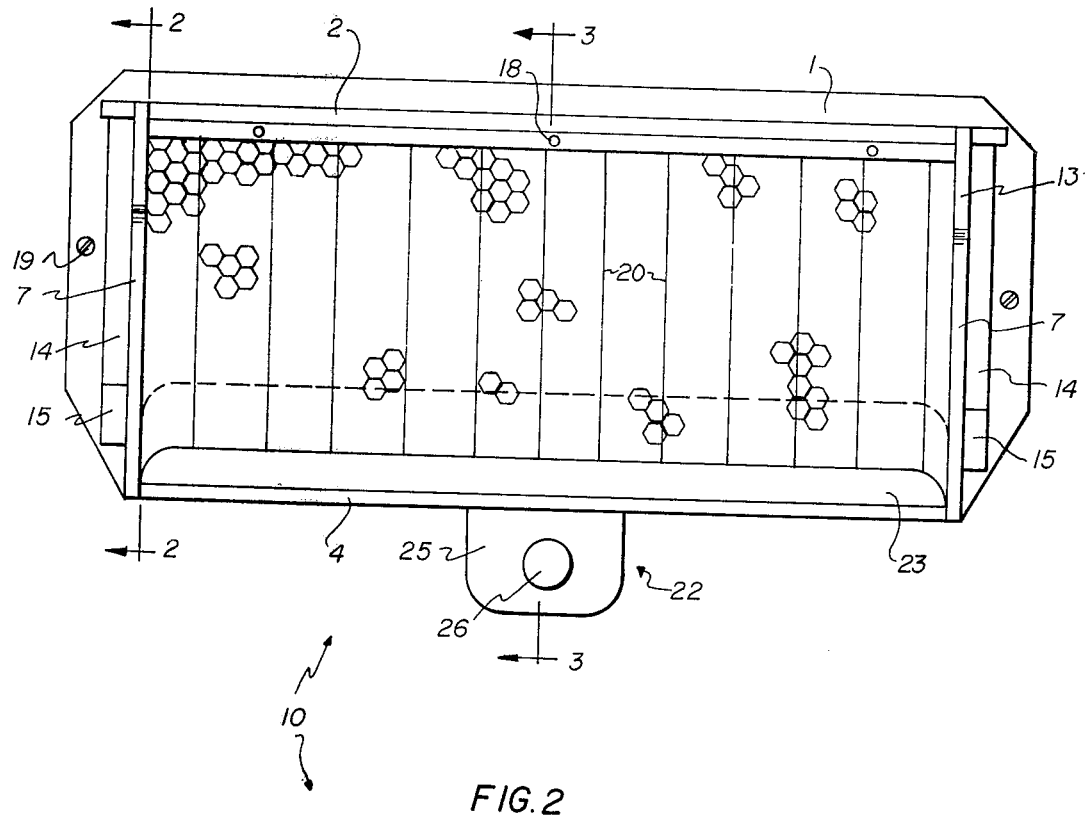
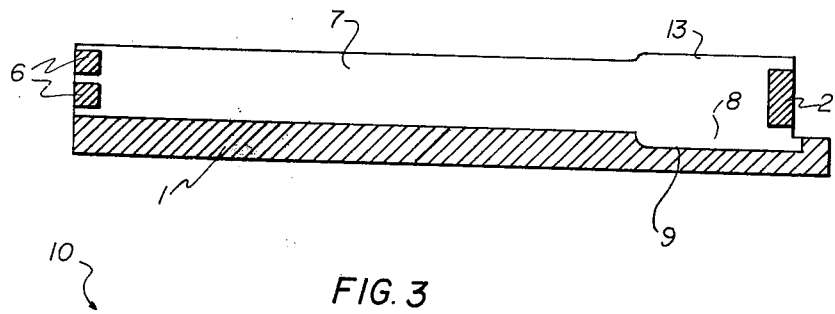
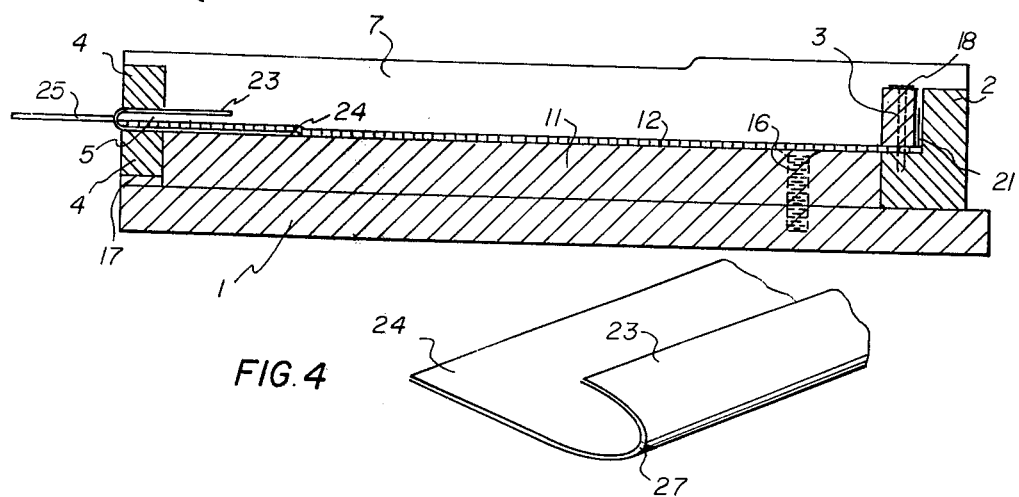

BEE KEEPING APPARATUS

BACKGROUND OF THE INVENTION

In bee keeping, it is frequently necessary to deploy a new wax brooding foundation upon which the queen bee will eventually plant her eggs once a suitable honeycomb network has been formed from the foundation. In this regard, the proper securing of the foundation is of utmost importance in assuring that proper passageways exist between adjoining vertically disposed foundations not only to provide ventilation but also to allow the bees to migrate from one area to another. Various attempts in the prior art have existed which allow foundations to be secured to a framework with various degrees of success, but none of the references of which applicant is aware falls within the scope of that which is taught in the ensuing patent description. The related prior art comprises the following:

U.S. Pat. No. 2,522,511 Hageman
U.S. Pat. No. 3,408,668 Paoletti
U.S. Pat. No. 2,604,643 Hamilton Hageman teaches the use of a beehive in which shoulders 36 support the landing board so that the edge of strip 31 will extend across passageways 15 to prevent bees from entering or leaving the hive but still provide ventilation.

The remaining references show the state of the art further and it is to be noted that none of these references suggest nor render obvious the specific frame structure nor the guide which forms an integral part of this application.

SUMMARY OF THE INVENTION

Accordingly, an object of this invention contemplates providing a wax brooding foundation which can be disposed within a framework in a minimal amount of time, especially when constrasted with the prior art.

A further object contemplates providing a guide member which will cause the wax brooding foundation to be correctly oriented and easily disposed upon the framework.

A further object contemplates providing a device of the character described above which is relatively inexpensive, easy to use, durable in construction.

These and other objects will be made manifest when considering the following detailed description of the drawings of the specification when taken conjunction with the drawings.

BRIEF DESCRIPTION OF THE DRAWINGS

FIG. 1 is a top plan view of the apparatus according to the present invention;

FIG. 2 is a sectional view taken along lines 2—2 of FIG. 1;

FIG. 3 is a sectional view taken along lines 3—3 of FIG. 1; and

FIG. 4 is a perspective view of a portion of the guide shown in FIGS. 1 and 3.

DESCRIPTION OF THE PREFERRED EMBODIMENT

Referring to the drawings now, wherein like reference numerals refer to like parts throughout the several drawing figures, reference numeral 10 is directed to the bee foundation frame according to the present invention.

This frame 10 may generally be regarded as being provided with a support base 1 upon which is provided a foundation platform 11. These two elements are interconnected by screws 16, the number of which will vary as a function of the size of the foundation platform 11. Extending around the periphery of the foundation is a ledge formed from the support base and this ledge area will be further described hereinafter.

A pair of spaced opposed parallel upwardly extending side rail supports 14 are provided on the base which in a preferred form have a tapered bottom portion 15 at one end thereof. Opposed from the tapered bottom portion and just inside of each side rail support there is provided a groove 9 which serves to align the grid or frame-work that supports the wax brooding foundation 12 as will be explained. The groove 9 registers with an aligning key 8 which is formed as an integral portion of the side rails 7, and opposite from the aligning key 8 on the top portion of the side rails 7 there is provided a raised top portion 13 so that when a plurality of these frames are put in vertical adjusted positions the narrower portions of the side rails 7 serve as a pathway for bees to gain entrance into the grid. Therefore, the two parallel side rails 7 are oriented properly by means of the groove 9, and further these side rails 7 are interconnected by a back rail support 2 which has a substantially L-shaped medial portion such that the L is directed inwardly and provides a ledge area the height of which coincides with the height of foundation platform. Terminal portions of the back rail support 2 taper somewhat so that the raised top portion and aligning key 13 and 8 respectively overlie and underlie the terminal portion of the back rail support as shown in FIG. 2 to assure a snug fit.

As shown in FIG. 3, a wax brooding foundation 12 is placed upon the foundation platform 11 in such a manner that a terminal portion of the foundation 12 lies upon the ledge of the back rail support 2, and a wedge 3 is provided having nails 18 therein so that the portion that is supported upon the ledge can be affixed thereon. In a preferred form, the wax brooding foundation as its name would suggest is formed from wax and has a plurality of wire elements 20 disposed therein, terminus 21 of which is caused to lie between the back rail support 2 and the wedge 3. The terminus 21 is shown in FIG. 3.

The side rails 7 are further interconnected by means of a split front rail support 4 which has forked end portions 6 as shown in FIG. 2 and the side rails 7 have openings therein adapted to receive the upper and lower front rails so that they are securely locked thereon. The space between the split front rail supports define an opening 5, which allows for insertion therethrough of a guide 22 as will be explained hereinafter.

The guide 22 is defined by a substantially U-shaped member preferably made of sheet metal having some spring resilience, and the guide's bottom portion 24 has a greater length then the guide's top portion 23 as shown in FIG. 4. The bent portion 27 which interconnects the top and bottom portions is the area which will undergo deformation as it is threaded through the upper and lower portions of the split front rail support 4 and the manner in which it is to be used can now be described.

Preferably the support base 1 is on a workbench or similar area and for this purpose screws 19 are provided at remote positions thereof to fasten onto the workbench and these screws 19 deter the base from translation while being worked upon. The rectangular frame is positioned on the support base and the wax brooding foundation 12 is placed upon the foundation platform. The guide 22 is threaded through the split front rail support as shown in FIG. 3 and the wax brooding foundation 12 is laid thereon and aligned so that the entire grid of the framework is covered. A terminal portion of the wax brooding foundation 12 lies upon the ledge of the back rail support 2 and at that time the wax foundation is nailed thereon with the wedge 3. The guide 22 is provided with a tab element 25 substantially at a medial portion thereof having an opening 26 therein which defines a handle for the guide 22 so that an easy purchase thereon may be afforded and the guide may be removed so that the wax brooding foundation is solely contained and perfectly aligned within the framework. Thereafter, the upper and lower portions of the split front rail support can be tacked together so that the wax brooding foundation is clearly affixed within the framework and can not be displaced. Given the forked end portions 6 of the split front rail support 4, it is necessary or desireable to provide a shim 17 under the lowermost rail so that when tacking the upper and lower split portions, the frame does not deform or deflect unduly.

In view of the foregoing, it can be seen that a device has been provided which securely affixes a wax brooding foundation to a framework without the problems associated with the prior art. This is important, since excessive manipulation of the wax brooding foundation 12 has been shown to have a deleterious effect on the strength of the substance, and since a queen bee which will lay her eggs upon portions thereof will place approximately one thousand eggs upon even a medium sized wax brooding foundation along with the associated food and honeycomb network to be supported thereon, any excessive and undue handling of the wax brooding foundation could cause ruptures to appear which would have a negative affect upon the process of the queen bee.

Further, it should be apparent that although a specific structure has been delineated hereinabove numerous structural modifications are contemplated as being a part of this invention as suggested hereinbefore, and as defined hereinbelow by the claims.

What is claimed is:

1. A bee keeping frame for forming a brooding area, said frame comprising in combination:

a pair of spaced parallel side rails interconnected by a back rail support which extends beyond terminal portions of said side rails and further interconnected by a split front rail support which terminates at ends of said side rails remote from said back rail support, said back rail support having a ledge portion facing into said frame, a wax brooding foundation extending from said ledge portion covering an inner area of said frame and terminating substantially along the length of and between outer faces of said split front rail support;

a guide for securing and orienting said wax brooding foundation to said frame defined by:

an elongate strip of substantially U-shaped configuration having a top guide portion and bottom guide portion interconnected by a curved bent portion between which said wax brooding foundation is interposed and wherein said guide has a handle extending from said bent portion away from the "U".

2. The device of claim 1 wherein said handle has a gripping hole extending therethrough.

3. The device of claim 2 wherein said top guide portion is shorter than said bottom guide portion.

4. The device of claim 3 wherein said back rail support and said side rails interconnect through joints defined by a raised top portion on said side rail which extends over said back rail support and terminates flush with an outer face of said back rail support, and a raised aligning key opposite from and similarly configured as said raised top portion.

5. The device of claim 4 wherein said split front rail support terminates in said side rails in forked end portions.

6. The device of claim 5 in which a wedge nails said wax brooding foundation to said ledge of said back rail support, and when said guide is removed said split front rail is nailed together fastening said wax brooding foundation therebetween.

7. The device of claim 6 wherein said frame rests on a support base through a foundation platform screwed to said support base, said support base having grooves under said aligning keys of said side rails, said platform further having side rail supports extending upwardly therefrom against outer faces of said side rails.

8. The device of claim 7 in which said side rail supports have a tapered bottom portion, screws are provided through said support base to affix same to a workbench, and a shim is provided between said front rail support and said support base.

9. The device of claim 8 wherein said wax brooding foundation is wire reinforced and terminal portions of said wire extend between said wedge and said back rail support.

* * * * *